(12) United States Patent
Lovenberg

(10) Patent No.: US 7,712,763 B2
(45) Date of Patent: May 11, 2010

(54) TRAILER HITCH RECEIVER LOCK

(76) Inventor: Joel L Lovenberg, 113 Glen Abbey Ln, DeBary, FL (US) 32713

( * ) Notice: Subject to any disclaimer, the term of this patent is extended or adjusted under 35 U.S.C. 154(b) by 33 days.

(21) Appl. No.: 12/239,293

(22) Filed: Sep. 26, 2008

(65) Prior Publication Data
US 2009/0079162 A1    Mar. 26, 2009

Related U.S. Application Data

(60) Provisional application No. 60/975,285, filed on Sep. 26, 2007.

(51) Int. Cl.
*E05B 67/38*    (2006.01)
(52) U.S. Cl. .......................................... 280/507; 70/258
(58) Field of Classification Search ................. 280/507; 70/237, 258
See application file for complete search history.

(56) References Cited

U.S. PATENT DOCUMENTS
6,467,317 B1 *   10/2002   Hillabush et al. .............. 70/56

* cited by examiner

*Primary Examiner*—Lesley Morris
*Assistant Examiner*—Levon Fiore
(74) *Attorney, Agent, or Firm*—Donald W. Meeker

(57) ABSTRACT

A freely pivoting lock ball fits within a trailer hitch ball receiver. A top lock shaft on the ball extends up through a hole in the top of the ball receiver into a lock collar welded to the top of the ball receiver. A cylinder lock fits into a top opening in the lock collar over the lock shaft to lock the lock ball within the ball receiver to prevent theft by towing the trailer with a conventional towing hitch ball. The cylinder lock and lock ball spin freely within the ball receiver and collar to prevent drilling or sawing the lock. There is no room between the cylinder lock and collar or between the ball lock and ball receiver to pry them loose. The lock collar is too thick for cutting with a bolt cutter.

6 Claims, 1 Drawing Sheet

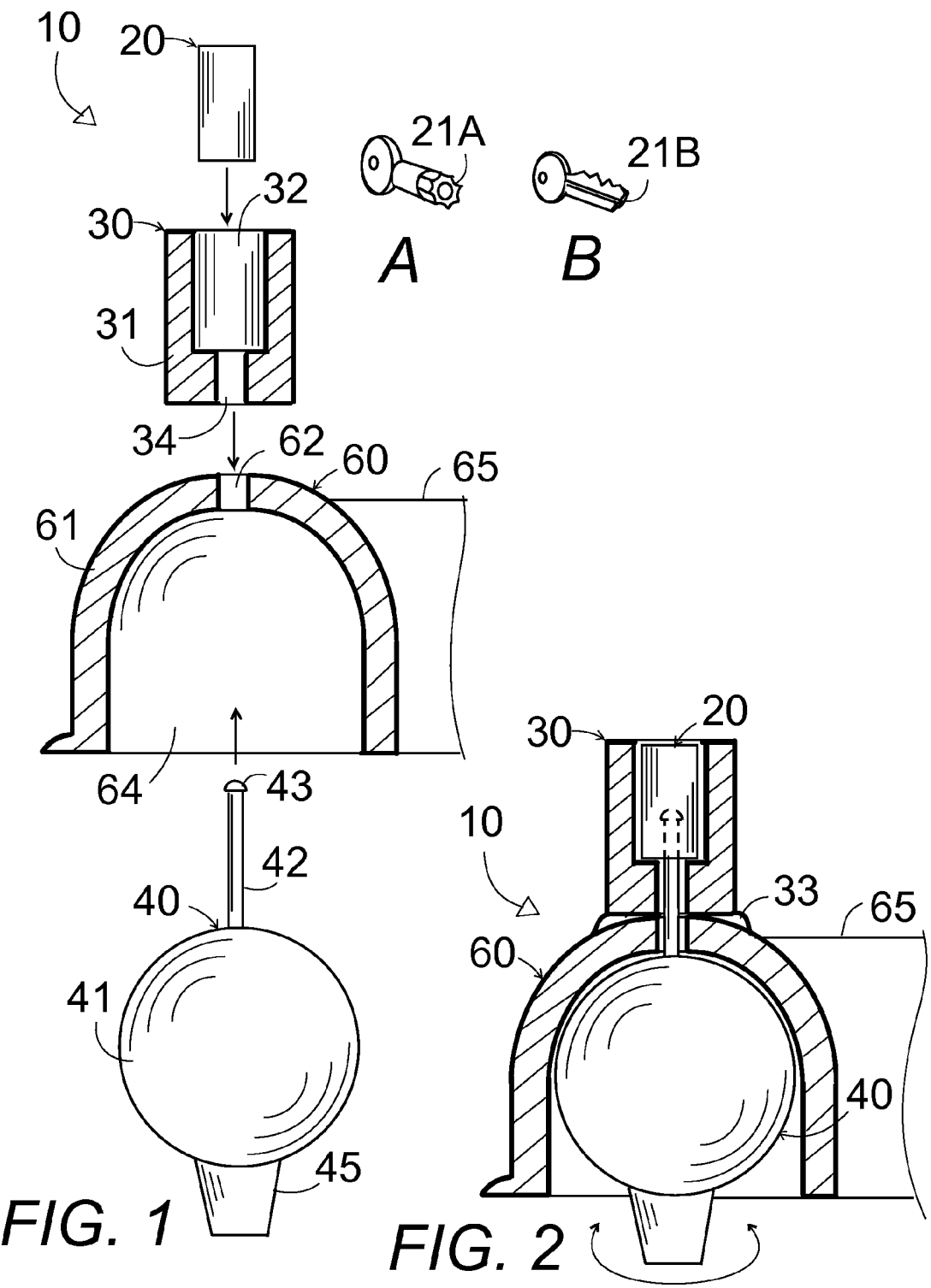

TRAILER HITCH RECEIVER LOCK

CROSS-REFERENCE TO RELATED APPLICATIONS

The present utility patent application claims the benefit of provisional application No. 60/975,285 filed Sep. 26, 2007.

STATEMENT REGARDING FEDERALLY SPONSORED RESEARCH OR DEVELOPMENT

Not applicable.

THE NAMES OF THE PARTIES TO A JOINT RESEARCH OR DEVELOPMENT

Not applicable.

BACKGROUND OF THE INVENTION

1. Field of the Invention

The present invention relates to trailer security locks, and in particular to a trailer security lock having a freely pivoting lock ball within a trailer hitch ball receiver with a lock shaft extending up through a hole in the top of the ball receiver into a collar welded to the top of the ball receiver and having a cylinder lock fitting into the collar over the lock shaft to lock the lock ball within the ball receiver to prevent theft by towing the trailer with a conventional towing hitch ball, wherein the cylinder lock and lock ball pivot freely within the ball receiver and collar to prevent drilling or sawing the lock and there is no room between the cylinder lock and collar or between the ball lock and ball receiver to pry them loose and the collar is too thick for cutting.

2. Description of Related Art Including Information Disclosed Under 37 CFR 1.97 and 1.98

It is common for trailers of all types to be stolen by a vehicle with a trailer hitch ball being attached to the trailer hitch ball receiver and the trailer hauled away by the vehicle. This is true of house trailers, boat trailers, vehicle trailers, utility trailers, construction equipment trailers and any type of trailer having a trailer hitch ball receiver. Padlocks on trailer latches are easily cut by bolt cutters. Prior art devices fail to adequately address the problem to provide a trailer hitch ball receiver lock which cannot be easily removed from the trailer hitch.

U.S. Pat. No. 5,222,755, issued Jun. 29, 1993 to O'Neal, provides a trailer lock for preventing the use of a conventional trailer tongue hitch on an unattached trailer vehicle. The lock comprises a towing ball securely fastened to a chain which, in a preferred embodiment, is installed in the socket of a trailer tongue to prevent an unattached trailer from being attached to an unauthorized towing vehicle.

U.S. Pat. No. 4,459,832, issued Jul. 17, 1984 to Avrea et al, indicates a pivotally mounted coupling guard, extending over a ball engaging socket of a trailer hitch to preclude disengagement of the socket from the ball, is locked in place to deter unauthorized disengagement of the socket from the ball and theft of the attached trailer. A lock module penetrably receives and locks therein essentially all of the extending ends of both the pivot pin and the retaining pin of the coupling guard to preclude unauthorized pivotal movement of the coupling guard.

U.S. Pat. No. 6,244,614, issued Jun. 12, 2001 to Bonvillain, is for a ball fastened to a base plate received within the socket of a trailer hitch, with a box shaped, open ended housing slipped over the exposed end of the tongue, hitch, and plate. The plate has a pierced tang that extends through the closed end of the housing and into a tubular extension projecting from the housing. A purchase item cylindrical, keyed, tumbler operated, lock slips into the bore of the extension and projects a key operated, retractable, transversely movable, shot bolt through the pierced hole of the tang. The lock is protected within the extension, and the apparatus has no parts exposed for tampering.

U.S. Pat. No. 6,722,686, issued Apr. 20, 2004 to Koy, describes a device for closing the socket of a trailer hitch, generally called a coupler lock, generally comprising a locking bar and a base having a plug member, a locking bar-receiving aperture, and an integral locking means for lockingly engaging the locking bar within aperture. When the coupler lock is attached to a trailer coupler, the trailer hitch socket is not accessible without removing the coupler lock with the appropriate key. Thus, theft of an unattended trailer is deterred due to the difficulty in attempting to remove the locking device. Providing a coupler lock having an integral locking mechanism better deters the tampering with or removal of the locking mechanism to remove the coupler lock from the trailer hitch as is possible in the art.

U.S. Pat. No. 5,794,961, issued Aug. 18, 1998 to Niswanger, shows an anti-theft device that can be used on different size trailer tongues of the type having a socket for receiving a tow ball of a trailer hitch. The device includes a base and a socket insert that projects from the base and is received within the socket of the trailer tongue. A pair of side members are joined to the base and oriented so that the trailer tongue must be passed between the side members for insertion and removal of the socket insert from the trailer tongue socket. Each side member has first and second holes formed therein. A retaining rod inserts into either of the first and second holes of the side members so that the retaining rod extends between the side members and above the trailer tongue to prevent the passage of the trailer tongue between the side members and thus prevent removal of the socket insert from the trailer tongue socket. The first and second holes are each located at different positions to accommodate trailer tongues of different sizes. A locking device is provided for preventing removal of the retaining rod from either of the first and second holes of the side members.

U.S. Pat. No. 4,756,172, issued Jul. 12, 1988 to Weaver, describes an anti-theft device for use with boat trailers or other trailers having a tongue with a ball socket thereon for engagement with a hitch ball connected to a towing vehicle. The lock includes a hitch ball mounted on top of a vertically adjustable support stand with the ball being received in the ball socket on the trailer tongue. The support stand includes a pivotal lock member which includes a portion closely overlying the upper surface of the ball socket with a padlock assembly securing the lock member in locking position. A lock guard is provided to protect the padlock assembly by preventing easy access to the padlock assembly by bolt cutters or other similar cutting implements.

U.S. Pat. No. 3,884,055, issued May 20, 1975 to Vuillemot, claims a theft deterrent trailer hitch lock device to lockably obstruct the socket portion of a trailer hitch, the device having an elongated plate which closes at least a portion of the opening into the socket, a plug which is inserted into the trailer hitch socket and a bar which can be positioned over the trailer hitch and locked in place so that the socket portion of the trailer hitch is contained between the bar and the elongated plate.

U.S. Pat. No. 6,644,071, issued Nov. 11, 2003 to Gilbertson, shows a trailer hitch locking system for securing a trailer while hitched to a vehicle or protecting the trailer from theft while unhitched. The locking system includes a hitch lock, a ball lock, and a receiver pin lock.

U.S. Pat. No. 4,571,964, issued Feb. 25, 1986 to Bratzier, discloses a locking assembly to prevent unauthorized access to a trailer hitch which includes a metallic casing which is slideably placed over and around the socket end portion of the hitch and which cooperatively receives a locking bar having a first extended portion which is receivable within the hitch socket and a second extended portion which is selectively secured to the interior of the metallic casing to thereby lock the assembly in fixed position with respect to the trailer hitch.

U.S. Pat. No. 5,873,271, issued Feb. 29, 1993 to Smith, puts forth a locking device for a trailer and hitch of the ball and socket type, comprising an upper jaw and a lower jaw interconnected together by a shaft for reciprocal movement relative to each other. A locking mechanism keeps the two jaws apart at fixed distances over a ribbed portion of the shaft. In use, the two jaws are locked about the socket portion of the hitch to prevent unauthorized removal of the trailer. When the trailer is attached to a tow vehicle, the tow ball nut is received in an opening in the lower jaw. When the trailer is unattached, a dummy ball extends into the socket of the hitch. In both position, the socket portion of the hitch is received in an aperture in the upper jaw.

U.S. Pat. No. 2,571,349, issued Oct. 16, 1951 to Eckles, illustrates a trailer hitch lock for covering the ball receiver of a trailer using a hinged clamp and padlock means with a cylindrical element inserted into the ball receiver.

U.S. Pat. No. 6,405,569, issued Jun. 18, 2002 to Kite, provides a theft prevention lock for trailers with socket-type hitches having a first plate element having a base portion and inner and outer ends. An upwardly extending arcuate protrusion is formed on the inner end of the first plate to penetrate the socket of a trailer hitch through an open bottom of the socket. An upwardly extending ear is on the outer end of the base portion and has a aperture therein. A second plate element has a lower end and an upper portion curving upwardly and terminating in a hook element with a lower arcuate portion complimentary in shape to the arcuate portion formed on the inner end of the first plate element. An aperture is in the second plate registering with the aperture in the ear of the first plate. The first and second plates are pivotally connected together. The shape of the first and second plates is such that when the apertures in the plate elements are in a registered position, a slot exists between the lower edge surface of the hook element and the outer edge surface of the arcuate protrusion on the inner end of the first plate. A U-shaped lock bar of a padlock is adapted to extend through the registered apertures in the first and second plates to receive a wall portion of a socket-type hitch.

U.S. Pat. No. 6,019,337, issued Feb. 1, 2000 to Brown, claims a Lockable Stand for Trailers comprising an upwardly-extending pedestal assembly terminating in a head assembly that is configured to lockably attach to a trailer tongue. The preferred head assembly will further include a detachable ball for accepting the trailer tongue and a pair of vertical side brackets through which a removable tongue lock extends to prevent the tongue from being removed from the ball. The stand is very compact for convenience, while also being stable to prevent trailer roll-away. In another preferred form, the pedestal assembly is height-adjustable to accommodate a variety of trailer styles and designs. The pedestal assembly might also be made from two telescoping pieces that can further be disassembled for storage or transport.

U.S. Pat. No. 5,094,423, issued Mar. 10, 1992 to Almquist et al, discloses a security device (10) for a trailer having a body member (12) with an auger (30) projecting from the body member (12). The auger (30) rotatably anchors the body member (12) to the ground. A plug (40) projects from the body member (12) for insertion into a socket portion (62) of the trailer. A bail (46) surrounds a portion of the socket portion (62) and locks to the body member (12) such that movement of the body member (12) relative to the socket portion (62) is restrained.

U.S. Pat. No. 5,433,468, issued Jul. 19, 1985 to Dixon, indicates an apparatus to preclude the theft or unauthorized use of a trailer comprising a cylindrical member formed of a rigid material positionable in a vertical orientation, the cylindrical member having a cylindrical side wall, a closed top in a generally spherical configuration and an open bottom, the cylindrical member having an upper extent positionable in the downwardly facing recess with the lower extent of the cylindrical member located therebeneath; a cross bar positionable in a horizontal orientation extending diametrically through the side wall of the cylindrical member with its lower edge located co-planar with the lower edge of the open end of the cylindrical member and an upper edge, an aperture extending through each end of the cross member at a location radially remote from the axis of the cylindrical member and the side wall of the cylindrical member; and a pair of rigid arms, each arm having a lower aperture at its lower end, the aperture of each arm positionable in axial alignment with an associated aperture of the cross member, upper apertures in the arms at the upper extents thereof positionable in axial alignment above the central axis of the cylindrical member, each of the arms being formed with a bend whereby the arms may extend upwardly then angled inwardly when the apertures at the upper ends of the arm are in axial alignment.

U.S. Pat. No. 7,204,508, issued Apr. 17, 2007 to Hsai, discloses a trailer lock for locking a trailer ball cap including a lock housing, a lock, a latch bolt, a holding seat and a detent member. The lock housing has an opening to hold the lock, a U-shaped trough to hold the latch bolt, a through trough to hold the holding seat and allow the detent member to slide on the holding seat. The lock has a housing chamber on one side to couple with the trailer ball cap. The latch bolt can control movement of the detent member by turning of the lock so that the detent member is wedged in a latch trough on one end of the latch bolt, and a latch end of the latch bolt is extended and anchored in the housing chamber of the lock housing and locked on the trailer ball cap. When the trailer is separated from a vehicle, the trailer ball cannot be coupled thereby to provide theft-proof function.

What is needed is a trailer hitch ball receiver lock which prevents attachment of the trailer hitch ball receiver to a vehicle having a trailer hitch ball and which cannot be easily removed from the trailer hitch ball receiver.

BRIEF SUMMARY OF THE INVENTION

The primary object of the present invention is to provide a trailer hitch ball receiver lock which prevents attachment of the trailer hitch ball receiver to a vehicle having a trailer hitch ball and which cannot be easily removed from the trailer hitch ball receiver to insure security for trailers by making the trailer unable to be towed, moved or stolen by eliminating access to the tow-ball receiver part of the trailer.

In brief, a hole is drilled in the top of the trailers ball receiver. A collar with a two-stage bore is welded to the ball receiver (centered over the drilled hole). A lock ball fits inside the trailer hitch ball receiver with a lock shaft extending up through the hole in the top of the ball receiver. The collar has a small bottom bore opening surrounded by a thick wall to admit the locking shaft form from the lock ball in the ball receiver. The collar has a large cylindrical top bore opening surrounded by a thinner wall at the top of the collar extending down into the collar a sufficient distance to admit a cylinder lock inserted in the top opening. The locking shaft extends up into the top cylinder so that the cylinder lock locks onto the locking shaft with the cylinder lock fully inserted in the top opening.

The cylinder lock and lock ball rotate freely within the ball receiver and welded collar so that the lock cannot be drilled out or the locking shaft cut with a saw through the thick bottom portion of the collar. The collar is too thick for cutting with bolt cutters. There is not sufficient room between the cylinder lock and collar or between the lock ball and the ball receiver to pry the cylinder lock or the lock ball away from the collar and ball receiver. A small downwardly tapered conical point extending downwardly from the bottom of the lock ball serves as a grip for installing the lock ball up into the ball receiver, but the point cannot be gripped effectively by a jaw type tool in efforts to break the lock.

The lock ball with the top lock shaft are inserted into the trailers ball receiver, with the lock shaft fully inserted in the collar.

The lock cylinder is inserted into the top of collar and around the lock shaft and the lock is secured over the lock shaft. By Inserting and locking the lock ball and locking shaft in the ball receiver the trailer may not be towed on a trailer hitch ball without the key to unlock the lock ball.

The trailer security lock of the present invention provides a more secure lock for trailers because the lock collar part of the lock is welded to the trailer ball receiver becoming part of the trailer Itself. This security lock also few more deterrents to prevent prying, cutting or drilling. For greater security, the lock cylinder and lock shaft spin freely inside a hardened collar, preventing prying or drilling of the lock or sawing of the lock shaft. The lock ball is only slightly smaller in diameter than the ball receiver so that the lock ball spins within the ball receiver but a toll will not fit therebetween to prevent drilling, cutting, or prying, making it an extremely secure lock. The trailer security lock of the present invention is fabricated of a hardened metal alloy in different sizes to accommodate different size trailer ball receivers.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings:

FIG. 1 is an exploded side elevational view in partial section of the components of the trailer hitch ball receiving lock of the present invention aligned for assembly on the trailer hitch ball receiver;

FIG. 2 is a side elevational view in partial section of the components of the trailer hitch ball receiving lock of the present invention locked onto the trailer hitch ball receiver.

DETAILED DESCRIPTION OF THE INVENTION

In FIGS. 1 and 2, a trailer hitch ball receiver security lock device 10 comprises a lock ball component 40 having a steel sphere 41 fitting within a trailer hitch ball receiver 60 and a lock shaft 42 with an end lock knob 43 extending up through a top center hole 62 in the ball receiver through a thick walled bottom opening 34 in the lock collar 30 into a cylinder lock 20 in a top opening 32 in the lock collar 30 which is welded to the top of the ball receiver and having the cylinder lock 20 fitting down into the lock collar 30 locking onto the lock post 42 so that the cylinder lock 20, steel sphere 41, and lock shaft 42 are secured to the ball receiver 60 and lock collar 30 and spin freely therein to prevent drilling the lock.

In FIGS. 1 and 2, the lock collar 30 is welded by a weld 33 onto a top of the trailer hitch ball receiver 60. The lock collar 30 comprises a hardened steel cylinder having a top cylindrical opening 32 through a vertical centerline of the collar for receiving a cylinder lock 20 therein with the cylinder lock fully inserted in the top cylindrical opening and the cylinder lock freely rotatable within the top cylindrical opening. The lock collar 30 has a bottom cylindrical opening 34 through the vertical centerline of the collar communicating with the top cylindrical opening 32. The lock collar 30 is centrally positioned over a top center hole 62 through a top of the ball receiver 60.

The lock ball component 40 is inserted up into the ball receiver interior hemispherical opening 64. The lock ball component 40 comprises a hardened steel sphere 41 spinning freely around a vertical centerline within the ball receiver shell 61. A lock shaft 42 with an outer end lock knob 43 extends upwardly from the hardened steel sphere 41 through the top opening 62 of the ball receiving into the two cylindrical openings 32 and 34 of the lock collar 30.

The cylinder lock 20 is inserted downwardly into the top cylindrical opening 32 and over the lock shaft 42 and lock knob 43 to lock onto the lock shaft, so that the cylinder lock 20 fits completely within the top cylindrical opening so that the cylinder lock cannot be pried out of the top cylindrical opening and a top key receiving opening of the cylinder lock facing upwardly to enable locking and unlocking of the cylinder lock. The steel sphere 41, the lock shaft 42, and the cylinder lock 20 all lock together, as shown in FIG. 2, to retain the steel sphere 41 within the ball receiver 60 to prevent the ball receiver from being mounted on a trailer hitch ball to prevent a theft of the trailer by towing on a conventional trailer hitch ball. The steel sphere 41, the lock shaft 42, and the cylinder lock 20 all spin freely about a center vertical axis, as shown by the double arrow curve, within the ball receiver 60 and the lock collar 30 to prevent drilling of the cylinder lock and prevent sawing the lock shaft 42 and the lock collar 30 is too thick for cutting with bolt cutters for security, thereby providing a secure trailer hitch ball receiver security lock.

A bottom holding tab 45 extends from a center of the bottom of the steel sphere 41. The bottom holding tab 45 comprises a downwardly pointing hardened steel cone for holding and guiding the steel sphere 41 and lock shaft 42 into place within the ball receiver 60. The bottom holding tab 45 extends downwardly no more than one inch so that the bottom holding tab may not be grasped by jaw type tools for security to prevent pulling the steel sphere from the ball receiver.

The cylinder lock 20 preferably comprises a tubular pin tumbler lock locking mechanism operated by a tubular key 21A, as shown in A of FIG. 1. The cylinder lock may comprise a lever lock locking mechanism operated by a lever lock key 21B, as shown in B of FIG. 1 or other type lock and key.

The cylinder lock 20 is sufficiently smaller in diameter than the top cylindrical opening 32 to allow free spinning of the cylinder lock about the vertical axis within the top cylindrical opening 32 and sufficiently large in diameter so that the cylinder lock 20 fits in sufficiently close proximity to the top cylindrical opening walls to prevent a prying tool from fitting therebetween to prevent separating the cylinder lock from the top cylindrical opening by a prying tool.

The steel sphere 41 is sufficiently smaller in diameter than the ball receiver opening 64 to allow free spinning of the steel sphere about the vertical axis within the ball receiver 60 and sufficiently large in diameter so that the steel sphere fits in sufficiently close proximity to the ball receiving interior walls and is recessed therein to prevent a prying tool from fitting therebetween to prevent separating the steel sphere from the ball receiver by a prying tool.

The lock collar 30 preferably comprises a hardened steel pipe like piece of metal with one end drilled with the top cylindrical opening 32 to accommodate the cylinder lock 20, while the bottom end is drilled with the bottom cylindrical opening 34 to accommodate the lock shaft 42 and lock knob 43 through the double bore opening.

The lock ball component 40 comprises a hardened steel sphere 41 a small downwardly tapered hardened steel truncated conical holder tab 45 on the bottom of the ball for holding and guiding the lock ball component 40 while inserting the steel sphere 41 upwardly into the ball receiver 60 at the end of the trailer hitch arm 65 and a longer hardened steel lock shaft 42 and lock knob 43 on top of the steel sphere.

The cylinder lock 20 spins rotatably within the top cylindrical opening 32 of the collar 30 and the internal jaws of the lock cylinder lock under the enlarged end lock knob 43 and around the lock shaft 42 with the cylinder lock 20, the lock shaft 42, and the steel sphere 41 free to rotate within the ball receiver so that drilling of the lock cylinder and cutting of the lock shaft 42 through the lock collar 30 are not possible. The cylinder lock 20 operates preferably with a tubular key 21A making it more difficult to pick or a regular lever lock key 21B or other lock and key type.

In use, the lock ball with the top lock shaft are inserted up into the trailers ball receiver, with the lock shaft fully inserted in the collar. The lock cylinder is inserted into the top of collar and around the lock shaft and the lock is secured to the lock shaft. By Inserting and locking the lock ball and locking shaft in the ball receiver the trailer may not be towed on a trailer hitch ball without the key to unlock the lock ball.

It is understood that the preceding description is given merely by way of illustration and not in limitation of the invention and that various modifications may be made thereto without departing from the spirit of the invention as claimed.

What is claimed is:

1. A trailer hitch ball receiver security lock device comprising:
   a lock collar welded onto a top of a trailer hitch ball receiver, the lock collar comprising a hardened steel cylinder having a top cylindrical opening through a vertical centerline of the collar for receiving a cylinder lock therein with the cylinder lock fully inserted in the top cylindrical opening and the cylinder lock freely rotatable within the top cylindrical opening, and the lock collar having a bottom cylindrical opening through the vertical centerline of the collar communicating with the top cylindrical opening, the lock collar centrally positioned over a top center hole through a top of the ball receiver;
   a lock ball component inserted up into the ball receiver, the lock ball component comprising a hardened steel sphere spinning freely around a vertical centerline within the ball receiver, a lock shaft extending upwardly from the hardened steel sphere through the top opening of the ball receiving into the two cylindrical openings of the lock collar;
   a cylinder lock inserted downwardly into the top cylindrical opening and over the lock shaft to lock onto the lock shaft, so that the cylinder lock fits completely within the top cylindrical opening so that the cylinder lock cannot be pried out of the top cylindrical opening and a top key receiving opening of the cylinder lock facing upwardly to enable locking and unlocking of the cylinder lock; the steel sphere, the lock shaft and the cylinder lock all locked together to retain the steel sphere within the ball receiver to prevent the ball receiver from being mounted on a trailer hitch ball to prevent a theft of the trailer by towing on a conventional trailer hitch ball; the steel sphere, the lock shaft, and the cylinder lock all spinning freely about a center vertical axis within the ball receiving and the lock collar to prevent drilling of the cylinder lock for security, thereby providing a trailer hitch ball receiver security lock.

2. The device of claim 1 further comprising a bottom holding tab extending from a center of the bottom of the steel sphere, the bottom holding tab comprising a downwardly pointing hardened steel cone for holding and guiding the steel sphere into place within the ball receiver, the bottom holding tab extending no greater than one inch so that the bottom holding tab may not be grasped by jaw type tools for security to prevent pulling the steel sphere from the ball receiver.

3. The device of claim 1 wherein the cylinder lock comprises a barrel lock locking mechanism operated by a barrel lock key.

4. The device of claim 1 wherein the cylinder lock comprises a lever lock locking mechanism operated by a lever lock key.

5. The device of claim 1 wherein the cylinder lock is sufficiently smaller in diameter than the top cylindrical opening to allow free spinning of the cylinder lock about the vertical axis within the top cylindrical opening and sufficiently large in diameter so that the cylinder lock fits in sufficiently close proximity to the top cylindrical opening walls to prevent a prying tool from fitting therebetween to prevent separating the cylinder lock from the top cylindrical opening by a prying tool.

6. The device of claim 1 wherein the steel sphere is sufficiently smaller in diameter than the ball receiver to allow free spinning of the steel sphere about the vertical axis within the ball receiver and sufficiently large in diameter so that the steel sphere fits in sufficiently close proximity to the ball receiving interior walls to prevent a prying tool from fitting therebetween to prevent separating the steel sphere from the ball receiver by a prying tool.

* * * * *